Aug. 5, 1969  A. D. CLARK ET AL  3,459,318
TREE FRUIT HANDLING RECEPTACLE
Filed Oct. 10, 1967  2 Sheets-Sheet 1
FIG.1
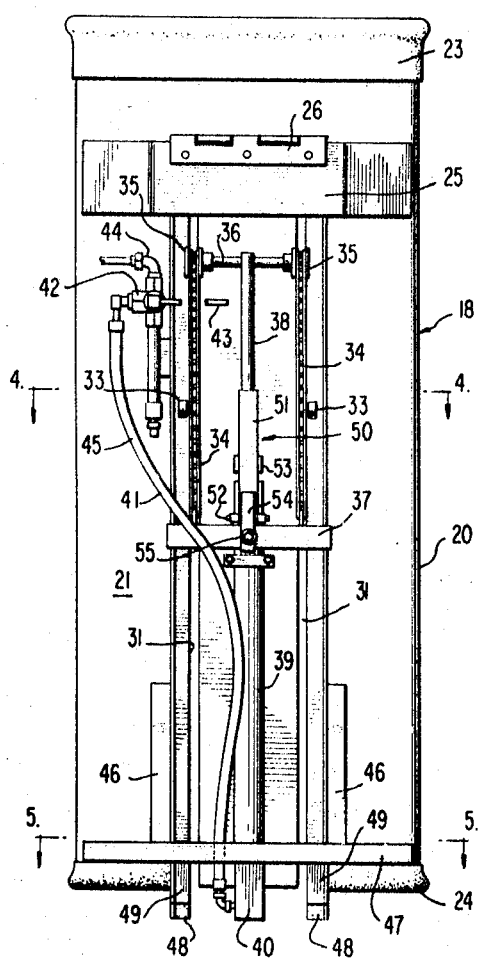
FIG.2
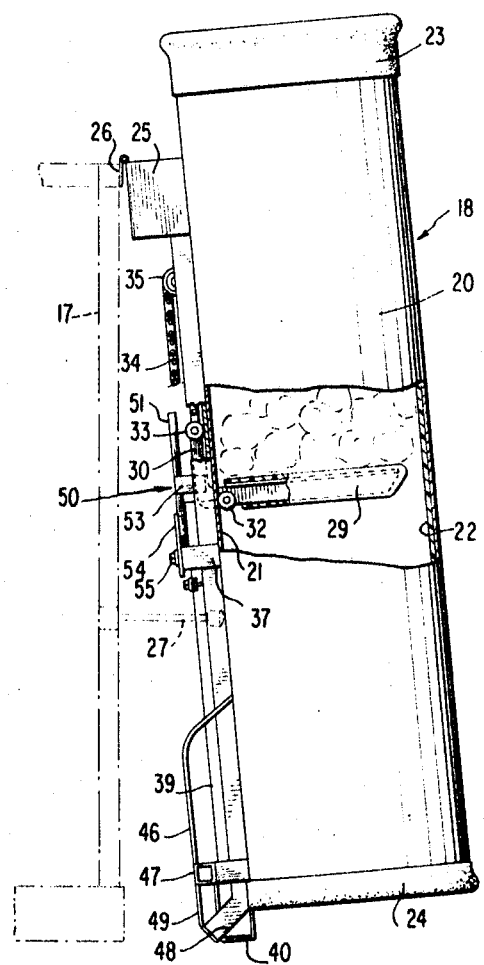
FIG.3
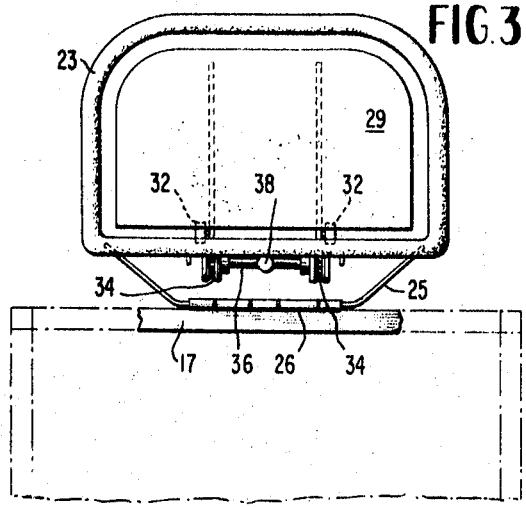
FIG.4

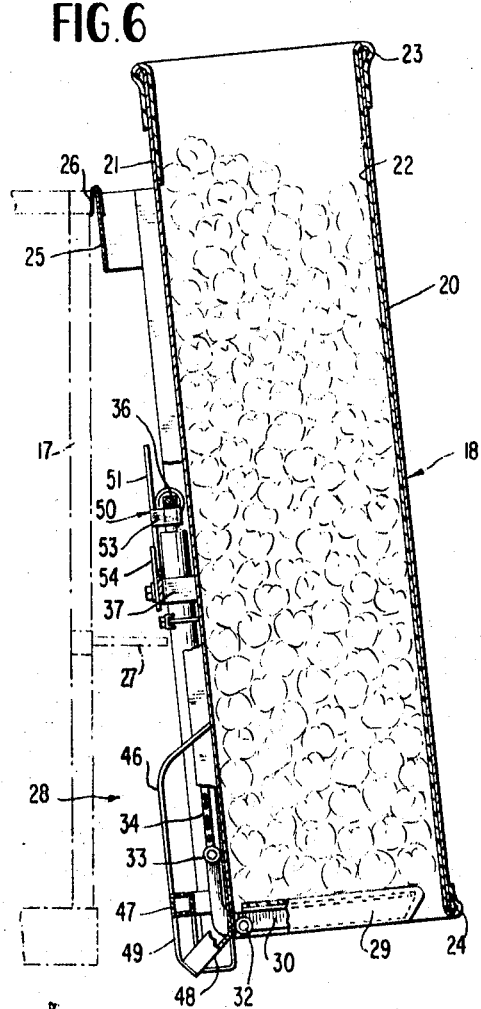
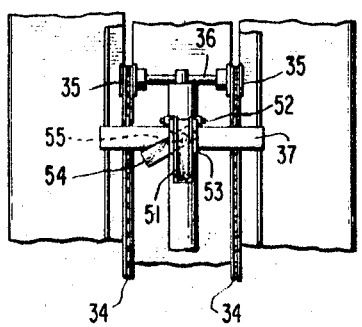
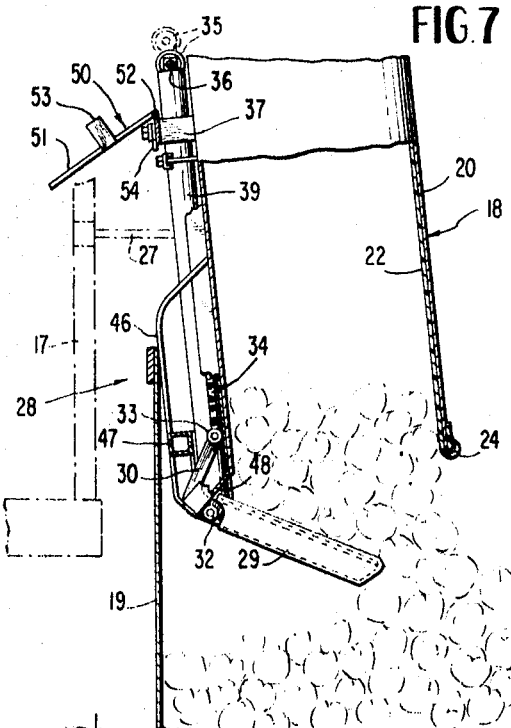
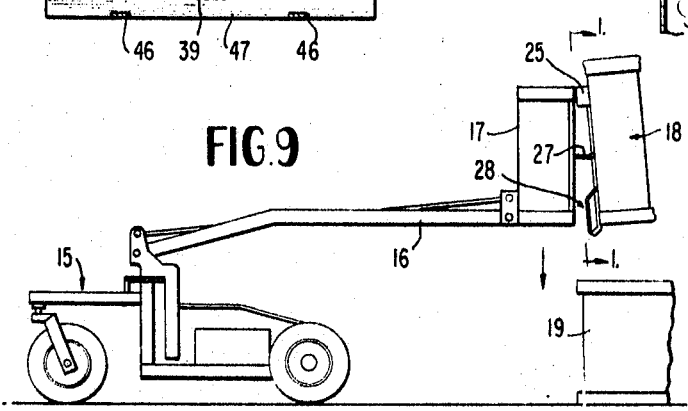

United States Patent Office 3,459,318
Patented Aug. 5, 1969

3,459,318
TREE FRUIT HANDLING RECEPTACLE
Arthur Delt Clark and Francis Delt Clark, both of Rte. 2,
Wapato, Wash. 98951
Filed Oct. 10, 1967, Ser. No. 674,259
Int. Cl. B60p 1/56
U.S. Cl. 214—83.1                               11 Claims

ABSTRACT OF THE DISCLOSURE

A receptacle carried by the lifting boom of a mobile orchard machine into which several bushels of fruit may be placed manually by the picker on the adjacent picker supporting cage. The receptacle has a drop bottom which gradually descends under the weight of the fruit, together with release means to facilitate gently depositing the fruit in a field bulk bin. The drop bottom is connected with a cylinder-piston unit which is connected with the low pressure discharge portion of the orchard machine hydraulic system.

BACKGROUND OF THE INVENTION

Machines are known to elevate a worker or picker to tree top level for harvesting tree fruit. The picker may carry a picker's bag or receptacle or may deposite the fruit in some sort of flexible chute which delivers the fruit to the ground. The latter method bruises the fruit and is not entirely practical. If the picker carries a small bag or receptacle, he must descend from the tree at frequent intervals and this is time-consuming and very awkward. Ideally, the picker should be able to collect five or six bushels of the tree fruit without descending from the tree and then deposit all of this fruit very gently in a bin at ground level without bruising or otherwise damaging the delicate fruit. The means for accomplishing this has not been known in the prior art and the present invention entirely satisfies the need which has existed in the art for a considerable length of time.

SUMMARY OF THE INVENTION

The invention comprises a vertically elongated receptacle for several bushels of fruit having a false bottom which is initially positioned at the top of the receptacle and moves downwardly gradually under the weight of fruit placed layer by layer on the false bottom. The false bottom is connected through a carriage structure with a low pressure cylinder-piston unit having a simple control valve. There is a readily releasable latch structure which is operated when the false bottom reaches the longer end of the receptacle to release the false bottom for dumping the fruit gently into a field bin. The entire device is carried on the boom structure of the mobile orchard machine directly adjacent the cage or platform for the worker or picker.

BRIEF DESCRIPTION OF THE DRAWINGS

FIGURE 1 is a rear elevational view of the invention taken substantially on line 1—1 of FIGURE 9;

FIGURE 2 is a side elevation of the device shown in FIGURE 1, with a portion of the worker cage shown in broken lines;

FIGURE 3 is a plan view of the invention;

FIGURE 4 is a horizontal section taken on line 4—4 of FIGURE 1;

FIGURE 5 is a fragmentary horizontal section taken on line 5—5 of FIGURE 1;

FIGURE 6 is a vertical cross sectional view of the invention showing the false bottom at the bottom of the receptacle before dumping;

FIGURE 7 is a similar view illustrating the dumping operation inside of a bin;

FIGURE 8 is a fragmentary rear elevation of the structure shown in FIGURE 7; and FIGURE 9 is a side elevation, on a reduced scale, showing the invention in use relative to a field bin and the orchard machine carrying it.

DESCRIPTION OF THE PREFERRED EMBODIMENT

Referring to the drawings, wherein like numerals designate like parts attention is invited first to FIGURE 9 showing a mobile orchard machine of the general character disclosed in prior U.S. Patent 2,954,092, issued Sept. 27, 1960. The machine is designated generally by the numeral 15 and is self-propelled and may maneuver itself among the trees of an orchard. The machine includes a boom 16 which may be raised to tree top height and lowered to a point close to the ground under control of the picker or worker standing in the cage 17 on the boom. The boom may also be swung from side-to-side so that the machine is highly maneuverable. As shown in FIGURE 9, the invention shown in its entirety at 18 attaches directly to the front of the worker cage and is bodily supported thereby so that it may be raised and lowered and maneuvered relative to a large collection bin 19 at a convenient point on the ground. The invention enables one picker to accumulate about six bushels of apples or the like while elevated and to then lower all of this fruit at one time and deposit it gently in the large bin 19. This is the general procedure which is followed when using the invention.

As shown in the other drawing figures, the invention proper comprises a generally rectangular vertically elongated receptacle or holder 20 whose top and bottom ends are essentially open and whose rear wall 21 is preferably flat, as shown in the drawings. The receptacle may be formed of heavy gage sheet metal or the like. All interior surfaces of the receptacle are preferably lined with foam rubber or the like as indicated at 22 and this lining is carried around the edges at the upper and lower ends of the receptacle as at 23 and 24 to fully protect the fruit, such as apples.

Near and below the upper end of the receptacle 20 on its rear side is a sturdy bracket or guard 25 spaced rearwardly of the wall 21 for a considerable distance and secured by a hinge 26 to the front of the worker cage 17 at the top thereof. The hinge 26 permits the lower end of the receptacle 20 to swing toward and away from the cage 17 under some circumstances, as required. At a point considerably below the elevation of the bracket 25, a pair of horizontal prop arms 27 or the like on the front of the cage 17 engage the rear wall of the receptacle 20 as best shown in FIGURE 4 to hold the receptacle spaced outwardly from the cage and slightly inclined to the vertical, as shown in FIGURES 2, 6 and 9. As will be explained, this arrangement allows the lower end of the receptacle to readily enter the top of the bin 19, as shown in FIGURE 7, for the dumping operation. The prop arms 27 maintain a sufficient space or passage 28 for this reason. If desired, the arms 27 may be made adjustable and these arms could form an attachment to the receptacle 20, if preferred, instead of an attachment to the cage 17, as described.

The invention further comprises a false bottom or platform 29 on the receptacle 20, also preferably completely covered with foam rubber or padding. The false bottom 29 is carried on a pair of laterally spaced L-shaped arms 30 which extend under the false bottom 29, as shown in FIGURE 4, and also extend through elongated vertical slots 31 in the rear wall 21. The horizontal and vertical portions of the arms 30 carry rollers 32 and 33 which engage track elements on the inner and outer surfaces of the wall 21, as shown clearly in FIGURE 4 so that the false bottom 29 may travel smoothly along the wall 21 from the top to the bottom of the receptacle 20.

The tops of the arms 30 are secured to chains 34 or like flexible members which extend upwardly close to the outer side of wall 21 in spaced relation and pass over pulleys 35 substantially upwardly on the receptacle, said pulleys being carried by a non-rotary crossbar or shaft 36. The ends of the chains 34 remote from the arms 30 extend downwardly from the pulleys 35 and are secured to a sturdy fixed cross bracket 37 on the rear wall 21.

The cross-shaft 36 carrying the pulleys 35 is secured at its middle to the upper end of reciprocatory piston rod 38 forming the extensible and retractable component of a cylinder-piston unit 39 fixedly secured to the bracket 37 near its upper end and to a rigid supporting element 40 at its lower end.

The lower end of the cylinder below the piston is connected with a hyrdaulic fluid line 41 extending to a control valve 42 on the rear wall 21 having an operating handle 43. One connection or fitting 44 of the valve 42 is connected with a line having a restrictor valve, not shown, said line being a low pressure line returning to the oil reservoir, not shown, of the hydraulic system. Another fitting 45 of the valve feeds oil from the system through the three-way valve 42 to the bottom of the cylinder 39 to raise the cross-shaft 36 and the false bottom 29 after a dumping operation.

At its lower end, the rear side of the receptacle 20 carries a pair of spaced guards 46 of sturdy construction connected by a rigid cross member 47, secured firmly to the rear wall 21. The guards 46 and cross member protect the cylinder 39, the chains and arms 30 and help to guide the lower end of the receptacle into the bin 19, as shown in FIGURE 7.

The slots 31 extend through the bottom edge of the rear wall 21, and at the bottom of the slots, rearwardly inclined depending short track extensions 48 for the interior rollers 32 are provided and rigidly connected with the heavy cross member 47 by straps 49. These track extensions 48 permit the false bottom 29 to descend to the inclined dumping position shown in FIGURE 7 after the false bottom has descended to the lowermost position of FIGURE 6 against the low pressure retarding force of the cylinder 39 and upon release of a latch device 50 now to be described.

The latch device 50 comprises a vertically swingable lever 51 having its lower end hinged at 52 to the top of bracket 37. The lever carries a pair of forwardly projecting lugs 53 which, prior to release, engage under cross-shaft 36 and arrest the downward movement thereof as in FIGURE 6 when the false bottom 29 is at the lower end of the receptacle 20 but not yet at the dumping position. That is to say, the weight of the fruit upon the false bottom will cause the same to slowly descend to the position of FIGURE 6 at which time the lugs 53 will positively arrest downward movement of the false bottom beyond this point until the latch device is released. A small plate 54 pivoted at 55 to the back of bracket 37 maintains the lever 51 in the upright latching position relative to the shaft 36. When the plate 54 is swung to one side, FIGURE 8, out of overlapping contact with the lever 51, the operator may pull the lever 51 rearwardly as depicted in FIGURE 7 and thereby release the shaft 36 to drop down into contact with the top end of cylinder 39, as shown. As this occurs, the final increment of movement of the arms 30 causes the rollers 32 to pass onto the inclined track extensions 48 and under influence of the weight of the fruit, the false bottom 29 will assume the dumping position shown in FIGURE 7. Contact of the shaft 36 with the top of the cylinder 39 prevents the rollers 32 from passing off of the bottom ends of track extensions 48. When the false bottom 29 is again elevated, the latch device 50 is returned to the active position of FIGURE 6. The slots 31 extend approximately to the top of bracket 25, and when the arms 30 are at the top of these slots by extension of the piston rod 38, the false bottom 29 will be very near the top of the receptacle 20 for receiving the first layers of fruit and beginning its gradual descent.

OPERATION

With the invention apparatus mounted on the worker's cage 17 of the orchard machine, as shown and described, the operator or picker standing in the cake 17 utilizes controls in the cage to maneuver the machine 15 through the orchard and to raise and lower the boom 16 and swing it from side-to-side as described in Patent 2,954,092. The picker adjusts the three-way valve 42 by means of the handle 43 to cause fluid pressure to enter the valve at 45 and to pass through the line 41 to the bottom of the cylinder 39, thereby elevating the false bottom 29 to its upper limit just below the top of the receptacle 20. The false bottom will ascend rather rapidly in the receptacle when free of any load. The valve 43 is adjusted to connect the line 41 with the low pressure return side of the system through the return fitting 44. This allows the false bottom 29 to descend gradually toward the position in FIGURE 6 as additional layers of fruit are picked and placed upon the false bottom, gradually filling the receptacle 20 with about six bushels of apples. The low pressure side of the hydraulic system and the restrictor valve contained therein will allow gradual bleeding of pressure acting on the bottom of the piston and thus the gradual descent of the false bottom 29 under the increasing weight of fruit. The hydraulic system is very simple and entirely conventional and need not be shown or described in greater detail.

When the receptacle 20 is approximately full, the false bottom 29 will have reached the bottom of the receptacle as in FIGURE 6 and the latch device 50 will have arrested the downward movement of the false bottom which of course moves with the shaft 36. The machine 15 is then maneuvered toward a bin 19 and the boom 16 is lowered so that one wall of the bin enters the space 28 between the cage 17 and the invention attachment 18. FIGURE 7 shows how the receptacle 20 may have its lower end moved down inside of the bin for gently discharging the fruit without bruising or dropping. When the proper elevation is reached with the boom 16, the operator releases the latch device 50, as previously described, and the false bottom will drop to the inclined dumping position to discharge the fruit.

When the receptacle 20 is emptied, the boom 16 is elevated from the bin and the picker adjusts the valve 42 to place the line 41 and lower end of cylinder 39 in communication with pressure through the inlet fitting 45. This pressure is sufficient to cause extension of the piston rod 38 and elevation of the shaft 36, chains 34 and false bottom 29. The latch device is returned to the active position and when the false bottom reaches the top of the receptacle 20, the valve 42 is adjusted to the lower pressure position, allowing bleeding through the fitting 44 and the picking operation is repeated to again fill the receptacle.

The invention allows a single picker or worker on the cage 17 of the mobile orchard machine to pick up to six bushels of apples or the like without interruption of his work and then to gently deposit all of these apples, without bruising or damage, into the large field bin 19 in a smooth and efficient operation. Heretofore, only small numbers of apples could be picked by a single worker carrying a bag or receptacle, or serious bruising of the fruit has resulted when gravity chutes of canvas or the like were utilized to convey the fruit from tree top height to the ground rapidly. The invention fully satisfies the needs of the art without sacrifice of the quality of the fruit or slowing the picking operation. The advan-

We claim:

1. A fruit handling attachment for an orchard machine having a boom and a worker support on the boom, said attachment comprising a receptacle for fruit mounted upon the worker support, a false bottom for said receptacle adapted to move from a point near the top thereof to a point adjacent the bottom of the receptacle, power means connected with said false bottom to elevate the same and to retard downward movement of the false bottom under the weight of the fruit but to allow the false bottom to gradually descend in the receptacle as successive layers of fruit are placed thereon, and releasable latch means to arrest the descent of the false bottom at the bottom of the receptacle and operable to release the false bottom to a fruit dumping position.

2. The invention as defined by claim 1, and carriage means for the false bottom connected with the power means and including rollers to engage and follow one wall of the receptacle during raising and lowering of the false bottom.

3. The invention as defined by claim 2, and wherein the carriage means comprises L-shaped arms secured to the false bottom, interior and exterior rollers on said arms engaging the interior and exterior of said receptacle wall, said wall having slots formed therethrough receiving said arms for movement.

4. The invention as defined by claim 1, and wherein the power means comprises an extensible and retractable fluid pressure cylinder-piston unit on the receptacle having a connection with the false bottom, the cylinder of said unit connected with a low pressure return line of a hydraulic system whereby the unit retards said downward movement of the false bottom without allowing the false bottom to drop abruptly.

5. The invention as defined by claim 1, and wherein the releasable latch means comprises a manually operated lever on the receptacle having a part shiftable into engagement with a part of the power means.

6. The invention as defined by claim 1, and wherein the receptacle is vertically elongated and substantially open at its top and bottom and padded with resilient material, said false bottom being padded, said power means comprising an extensible and retractable cylinder-piston unit on the receptacle including a crosshead, carriage arms for the false bottom, flexible elements secured to said arms and connected with the crosshead, and said releasable latch means including a member shiftable into the path of movement of the crosshead to positively limit the downward movement thereof.

7. The invention as defined by claim 3, and inclined track extensions on the lower end of the receptacle engageable with the interior rollers of said arms to guide the arms and false bottom to said dumping position upon release of the latch means.

8. The invention as defined by claim 1, and bracket means on the receptacle near its upper end secured to the worker support, and prop means interconnecting the worker support and receptacle at a point substantially below the bracket means to maintain the receptacle inclined slightly from the vertical and in downward divergent relation to the worker support and providing a passage between the worker support and receptacle to receive a wall of a field bin when the receptacle is lowered into the bin for the discharge of fruit therein.

9. A tree fruit handling device for an orchard machine comprising an elongated open-ended receptacle attachable to the boom structure of an orchard machine, a false bottom movable within the receptacle longitudinally thereof between said open ends of the receptacle, power means connected with the false bottom and allowing controlled elevating and lowering of the false bottom within the receptacle, coacting guide and camming means for the false bottom on the receptacle, said camming means being at the bottom of the receptacle and causing the false bottom to move to an inclined dumping position under load when the false bottom engages the camming means, and releasable latch means for the false bottom to positively limit downward movement of the false bottom to a point above engagement with the camming means, the latch means when released allowing the false bottom to engage the camming means.

10. The invention as defined by claim 9, wherein the power means is a fluid pressure operated cylinder-piston unit on the receptacle having a connection with the false bottom and operable to elevate the false bottom and to retard the lowering thereof under load.

11. The invention as defined by claim 10, and a three way valve connected with the cylinder-piston unit including a connection with a low pressure return system of the orchard machine whereby the valve is adjustable to one position causing said retarded downward movement of the false bottom under load.

References Cited

UNITED STATES PATENTS

| | | |
|---|---|---|
| 1,987,916 | 1/1935 | Thompson. |
| 2,546,501 | 3/1951 | Hamilton. |
| 2,692,177 | 10/1954 | Larsen _____ 220—93 XR |

ALBERT J. MAKAY, Primary Examiner

U.S. Cl. X.R.

220—93; 232—43; 298—38